United States Patent
Yankov et al.

(10) Patent No.: US 8,861,057 B2
(45) Date of Patent: Oct. 14, 2014

(54) SPECKLE-REDUCED LASER ILLUMINATION DEVICE

(75) Inventors: Vladimir Yankov, San Carlos, CA (US); Igor Ivonin, Yubileinyi (RU); Alexander Goltsov, Troitsk (RU); Konstantin Kravtsov, Moscow (RU); Leonid Velikov, San Carlos, CA (US)

(73) Assignee: Ergophos, LLC, San Carlos, CA (US)

( * ) Notice: Subject to any disclaimer, the term of this patent is extended or adjusted under 35 U.S.C. 154(b) by 308 days.

(21) Appl. No.: 13/534,335

(22) Filed: Jun. 27, 2012

(65) Prior Publication Data

US 2014/0002875 A1    Jan. 2, 2014

(51) Int. Cl.
*G02B 5/32* (2006.01)

(52) U.S. Cl.
USPC .......................................................... 359/15

(58) Field of Classification Search
CPC .. G02B 27/48; G02B 5/0252; G02B 27/1093; G02B 6/00; G02B 27/4272; G02B 5/1861; G02B 6/0016; G02B 6/0035; G02B 6/0038; G02B 6/0043; G02B 6/02085; G02B 6/021; G02B 6/122
USPC .......................................................... 359/15
See application file for complete search history.

(56) References Cited

U.S. PATENT DOCUMENTS

| | | | |
|---|---|---|---|
| 6,975,294 B2 | 12/2005 | Manni et al. | |
| 7,489,714 B2 | 2/2009 | Park et al. | |
| 7,649,610 B1 | 1/2010 | Dultz et al. | |
| 7,668,406 B2 | 2/2010 | Schnee et al. | |
| 7,743,990 B2 | 6/2010 | Schnee et al. | |
| 7,862,183 B2 | 1/2011 | Frahm et al. | |
| 7,956,941 B2 | 6/2011 | Khan | |
| 8,004,754 B2 | 8/2011 | Kamm et al. | |
| 8,016,427 B2 | 9/2011 | Kasazumi et al. | |
| 8,180,188 B2 * | 5/2012 | Mossberg et al. | 385/37 |
| 2006/0012842 A1 | 1/2006 | Abu-Ageel | |
| 2008/0212034 A1 | 9/2008 | Aksyuk et al. | |
| 2008/0297731 A1 | 12/2008 | Powell et al. | |
| 2009/0175302 A1 | 7/2009 | Bazzani et al. | |
| 2009/0303572 A1 | 12/2009 | Grasser et al. | |
| 2010/0118386 A1 * | 5/2010 | Wessels et al. | 359/328 |
| 2010/0265420 A1 | 10/2010 | Lescure et al. | |
| 2010/0296061 A1 | 11/2010 | Silverstein et al. | |
| 2010/0296065 A1 | 11/2010 | Silverstein et al. | |
| 2011/0216390 A1 | 9/2011 | Tong et al. | |
| 2014/0002876 A1 * | 1/2014 | Yankov et al. | 359/15 |

* cited by examiner

*Primary Examiner* — Jennifer L. Doak

(57) ABSTRACT

Proposed is a speckle-reduced laser illumination device that may be used in optical microscopy, machine vision systems with laser illumination, fine optical metrology, etc. The device comprises a net of planar ridge waveguides formed into an arbitrary configuration and having a plurality of holograms with holographic elements formed into a predetermined organization defined by the shape of a given light spot or light field which is to be formed by light beams emitted from holograms on the surface of an object or in a space and at a distance from the planar ridge waveguide. Speckling is reduced due to the fact that at least a part or all of the holograms are spaced from each other at distances equal to or greater than the coherence length. The geometry and organization of the holographic elements allow position control of the light spot and beam converging and diverging.

25 Claims, 14 Drawing Sheets

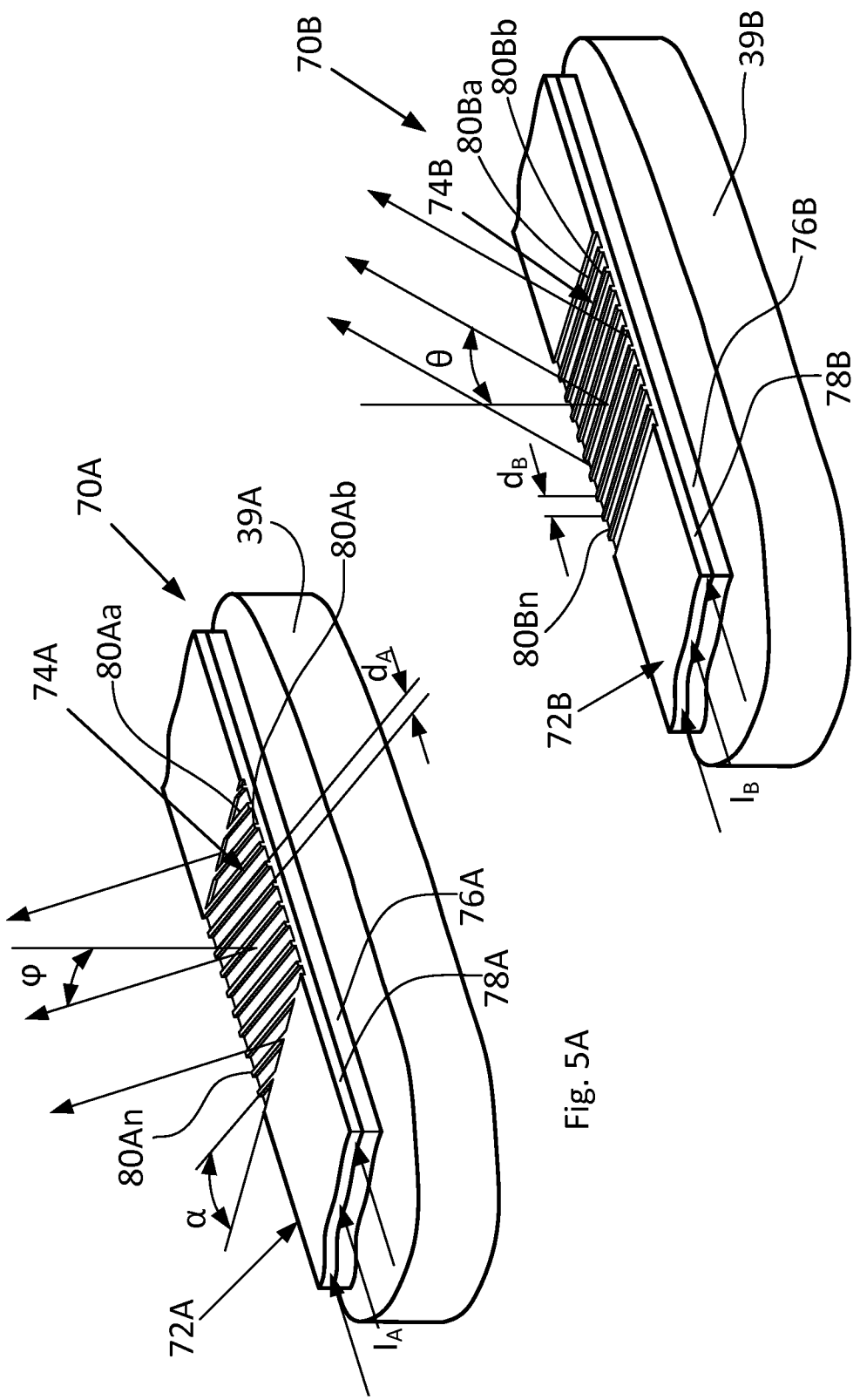

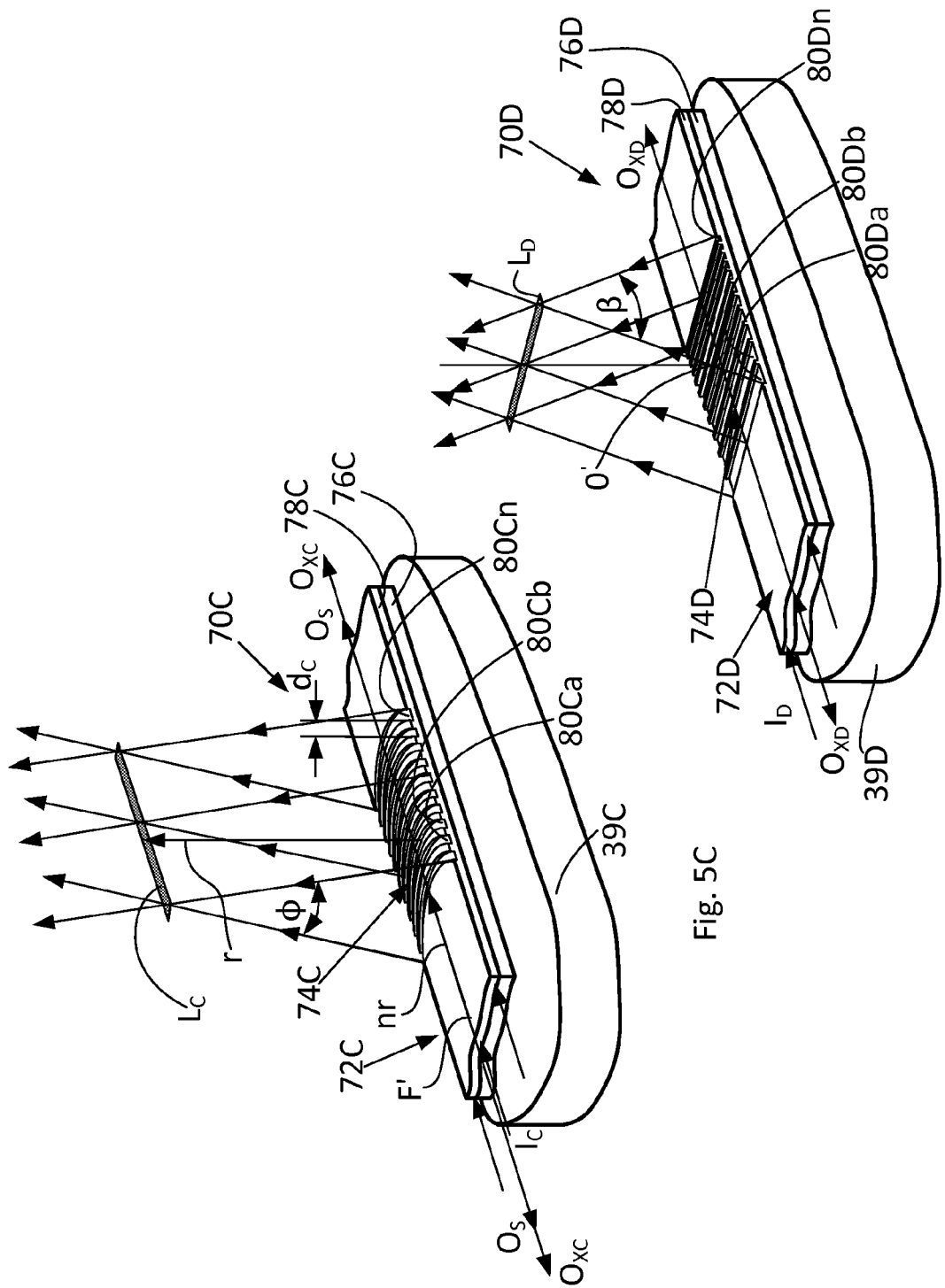

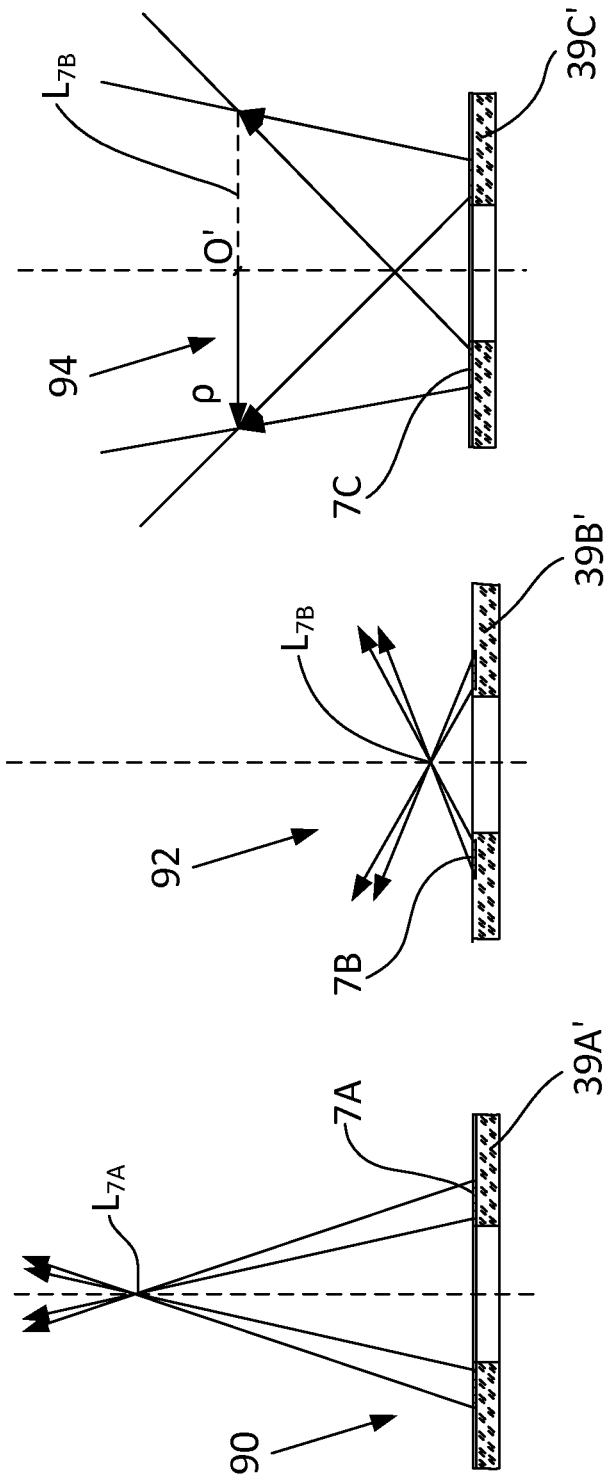

SPECKLE-REDUCED LASER ILLUMINATION DEVICE

FIELD OF THE INVENTION

The present invention relates to an optical illumination device, in particular, to a laser illumination device for use in microscopy, optical metrology, ophthalmology, optical coherent tomography, laparoscopic surgery, and in other fields where concentrated light of high intensity is necessary on a limited zone of interest.

BACKGROUND OF THE INVENTION

Well known are the advantages of using laser sources to illuminate objects for microscopic observation compared with using conventional sources or light-emitting diodes (LEDs). More specifically, laser illumination devices are characterized by very high brightness, high image contrast, wide color gamut, miniature dimensions, and high performance efficiency. In spite of these advantages, laser illumination devices have not yet achieved widespread application primarily because of a fundamental phenomenon that leads to microscopic image degradation, i.e., observation of a floating granular pattern in front of the image plane. This pattern is known as a speckle pattern that occurs from interference of light waves having different phases and amplitudes but the same frequency. The interaction of these waves produces a resultant wave, the amplitude and intensity of which varies randomly.

The speckle formation phenomenon can be explained in more detail as follows. When the surface of an object is illuminated with coherent light, e.g., with laser light, each point of the illuminated surface acts as a secondary point light source that reflects and scatters a spherical wave. However, since the illuminated surface has its own surface microstructure, these waves will have different phases and amplitudes. More specifically, in the majority of cases, the reflecting or light-passing surfaces that constitute the objects of observation have a roughness that is comparable to the wavelength of the illumination light. It can be assumed that the main contribution to the scattering of light is made by mirror reflections on small portions of a surface. As the roughness and size of an illuminated area increases, the number of light illuminating points also increases. Propagation of such reflected (transmitted) light to the point of observation leads to interference of dephased but coherent waves at that point. As a result, the observer sees a granulated or speckled pattern. In other words, speckles comprise an interference picture of irregular wavefronts that is formed when a coherent light falls onto a heavily roughened surface.

There exist both objective and subjective speckles. Objective speckles are formed in the entire space from the source of light to the illuminated surface. The picture of objective speckles can be seen, e.g., if a high-resolution visual sensor is placed at any point of the aforementioned space on the path of illumination light. However, if we observe an object illuminated by the same light, e.g., through a microscope, we see a picture of subjective speckles. Such a picture is called subjective since its parameters depend on the optical system of the microscope. This phenomenon does not change if we increase magnification. However, the greater the aperture, the thinner the speckled structure becomes since an increase in aperture decreases the diameter of the diffraction picture created by the microscope.

Thus, formation of speckles essentially restricts the scope of application of laser illumination devices in fields such as microscopy, vision with laser illumination, optical metrology, optical coherent tomography, etc. Quantitatively, speckles are usually evaluated by speckle contrast. The speckle contrast C is usually defined as the ratio of the standard deviation $\alpha$ of the intensity I to the mean intensity [I] of the speckle pattern:

$$C = \sigma/[I] = \sqrt{([I^2] - [I]^2)}/[I] \qquad (1)$$

For a static speckle pattern, under ideal conditions (i.e., when monochromatic and polarized waves are completely free of noise) the standard deviation $\sigma$ equals the mean intensity [I] and the speckle contrast is equal to unity, which is the maximum value for the contrast. Such a speckle pattern is termed "fully developed". On the other hand, complete absence of speckles corresponds to spatially uniform intensity of illumination. In this case standard deviation $\sigma$ is equal to $\sqrt{([I^2] - [I]^2)} = 0$. Thus, from formula (1) above, it is clear that speckle contrast may change from 1 to 0.

It is understood that a laser-type illuminator that provides illumination of an object with speckle contrast equal to or close to 0 may be considered as an ideal illumination light source.

Speckle contrast is reduced by creating many independent speckle patterns that are averaged on the retina of an eye or in a visual sensor. Speckle contrast can be reduced by changing illumination angle or by using different polarization states, laser sources with close but still different wavelengths, rotating diffusers, or moving or vibrating membranes that are placed on the optical path of the illuminating light. Many practical methods based on the aforementioned ideas for speckle contrast reduction are known and disclosed in patents, published patent applications, and technical literature. However, practically all of these methods are based on averaging independent speckle patterns created by light that is the same but that propagates along different optical passes.

SUMMARY OF THE INVENTION

The present invention relates to a laser illumination device wherein laser illumination is produced by overlapping a plurality of individual monochromatic laser lights of one or several different wavelengths, e.g., of red, green, and blue lights (hereinafter referred to as RGB). Such laser illumination device may be used as a monochromatic laser illumination device, e.g., infrared or a device that combines lights of more than three different wavelengths used in required intensity proportions, i.e., in a predetermined color gamut.

For better understanding of the invention, the term "coherence length" is used in the present patent specification. Coherence length is the propagation distance of light from a coherent source, e.g., a laser or a superluminescent diode, to a point where a light wave maintains a specified degree of coherence. Important to note in this connection is that speckling caused by interference is significant only within the coherence length of the source. Some laser diodes which are most suitable for use as light sources for the device of the invention have an illumination bandwidth of the emitted light from 0.6 nm to 2 nm. For the wavelength of the red light (632 nm) the coherence length can be defined as $L_C \approx \lambda^2/\Delta\lambda$, which is in the range of 1 mm to 200 µm.

In principle, the laser illumination device of the invention comprises one laser light source or a set of laser light sources of different wavelengths having its output coupled to individual ridge waveguides. These waveguides are formed into an arbitrary configuration, e.g., into parallel linear strips, flat spiral configuration, etc., that lay on a flat substrate. The neighboring ridge waveguide strips of different wavelengths are spaced from each other at distances comparable to their widths. Each individual ridge waveguide has on its surface a plurality of holograms located in sequence and at predetermined distances from each other. In order to prevent speckle formation, these distances should exceed the coherence length. However, even if neighboring holograms are spaced at distances shorter than coherence lengths, the majority of other holograms will exceed the limits of the speckle formation interaction. By selecting distances between holograms, it is possible to adjust the degree of speckle contrast to a predetermined value.

The geometry of the aforementioned holograms allows the emitted light beams to be directed at predetermined angles to the plane of the substrate. Furthermore, the light beams emitted from the holograms of different ridge waveguides can be collected in a predetermined region of space above the substrate. Herein the word "above" is conventional and depends on orientation of the planar substrate that supports the ridge waveguides since ridge waveguides can face up or down. Ridge waveguides may have any desired geometry and, depending on the pattern of the holograms, the aforementioned predetermined region, which hereinafter is referred to as "field of illumination", "focus region", or "light spot" may have a desired shape. For example, if ridge waveguides are formed into a flat spiral shape, the focus region may be formed into a light spot located on the axis that passes through the center of the spiral configuration and in a predetermined area above the substrate. This area may be positioned in any desired place. On the other hand, when ridge waveguides are formed into a group of parallel strips, they can be focused into a linear light strip located in a predetermined area above the substrate.

Laser illuminators built on the principle of the invention from the ridge waveguides that incorporates the specific holograms may find use in optical microscopes, confocal laser microscopy, machine vision systems with laser illumination, fine optical metrology, medical instrumentation, etc.

BRIEF DESCRIPTION OF THE DRAWINGS

FIG. 5A to FIG. 5G are three-dimensional views of waveguide portions according to various modifications of the illumination device of the invention illustrating control of emitted light and positions and shapes of light fields, depending on pattern and geometry of the holograms.

FIG. 7A is a sectional view of the spiral configuration in FIG. 1 along line VII-VII, illustrating formation of a linear or line light field in an area remote from the surfaces of the spiral waveguides.

FIG. 7B is a sectional view of the spiral configuration in FIG. 1, illustrating formation of a linear or line light field in an area close to the surfaces of the spiral waveguides.

FIG. 7C illustrates a waveguide portion of an illumination device in which the geometry and arrangement of holographic elements make it possible to form a diverging light beam to illuminate a predetermined area of interest.

DETAILED DESCRIPTION OF THE INVENTION

The present invention relates to a laser illumination device in which laser illumination is produced by overlapping a plurality of individual monochromatic laser lights of same or several different wavelengths, e.g., of red, green, and blue lights (hereinafter referred to as RGB). Such laser illumination device may find use as a monochromatic laser illumination device or a device that combines lights of more than three different wavelengths used in required intensity proportions, i.e., in predetermined monochromatic color ratios.

The term "coherence length" is used in the present patent specification for better understanding the principle of the invention. Coherence length is the propagation distance of light from a coherent source, e.g., a laser or a superluminescent diode, to a point where a light wave maintains a specified degree of coherence. Important to note is that interference which is responsible for speckling is strong within the coherence length of the light source and not beyond it.

Figure 1:
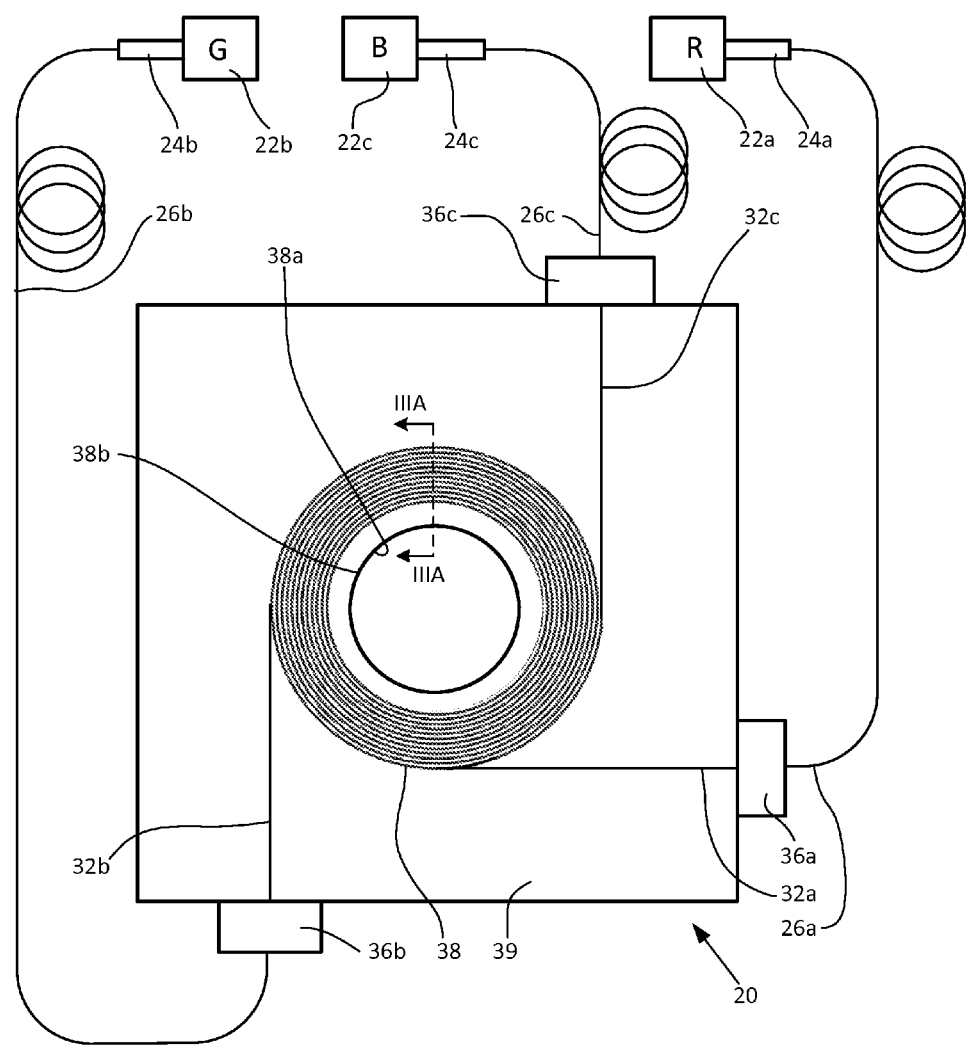
FIG. 1 is a schematic top view of the laser illumination device of the invention with the spiral configuration of a waveguide strip.

FIG. 1 is a schematic top view of the laser illumination device of the invention, which hereinafter is referred to as "illumination device" and which as a whole is designated by reference numeral 20. The illumination device 20 comprises a set of laser light sources 22a, 22b, and 22c, which in the illustrated modification of the illumination device 20 are red, green, and blue laser light sources, respectively (hereinafter referred to as "RGB laser light sources"). The three monochromatic RGB laser light sources are shown only for illustrative purposes, and the illumination device may contain only one monochromatic laser light source or more than three such sources. These laser sources are coupled through optical fiber connectors 24a, 24b, and 24c to respective optical fibers 26a, 26b, and 26c, the output ends of which are coupled to three quasi single-mode ridge waveguides 32a, 32b, and 32c through respective fiber-to-waveguide couplers 36a, 36b, and 36c. The term "quasi single-mode ridge waveguide" means that only one or a few transverse light modes of low order may propagate through the waveguides 32a, 32b, and 32c. Wavelengths of lights propagating through the waveguides 32a, 32b, and 32c are in the bandwidths of laser-diode lights. The ridge waveguides 32a, 32b, and 32c are provided with light-redirecting holograms (described in more detail later) and can be organized into various shapes. In the modification of the illumination device shown in FIG. 1, the ridge waveguides 32a, 32b, and 32c are organized into a flat spiral configuration 38, which is placed onto a planar substrate 39. The planar substrate can be made from transparent or nontransparent materials such as quartz, fused silica (transparent), silicon, ceramic (nontransparent), etc.

The flat spiral configuration is shown only as an example, and the ridge waveguides 32a, 32b, and 32c can be organized into other shapes. Although the ridge waveguides 32a, 32b, and 32c propagate red, green, and blue laser lights, the number of ridge waveguides may be less or greater than three, and the lights propagated through the ridge waveguides may be different from RGB. Also, there may be a plurality of such waveguide triples as ridge waveguides 32a, 32b, and 32c, and these triples can be arranged as parallel linear strips or as spirals.

Figure 2:
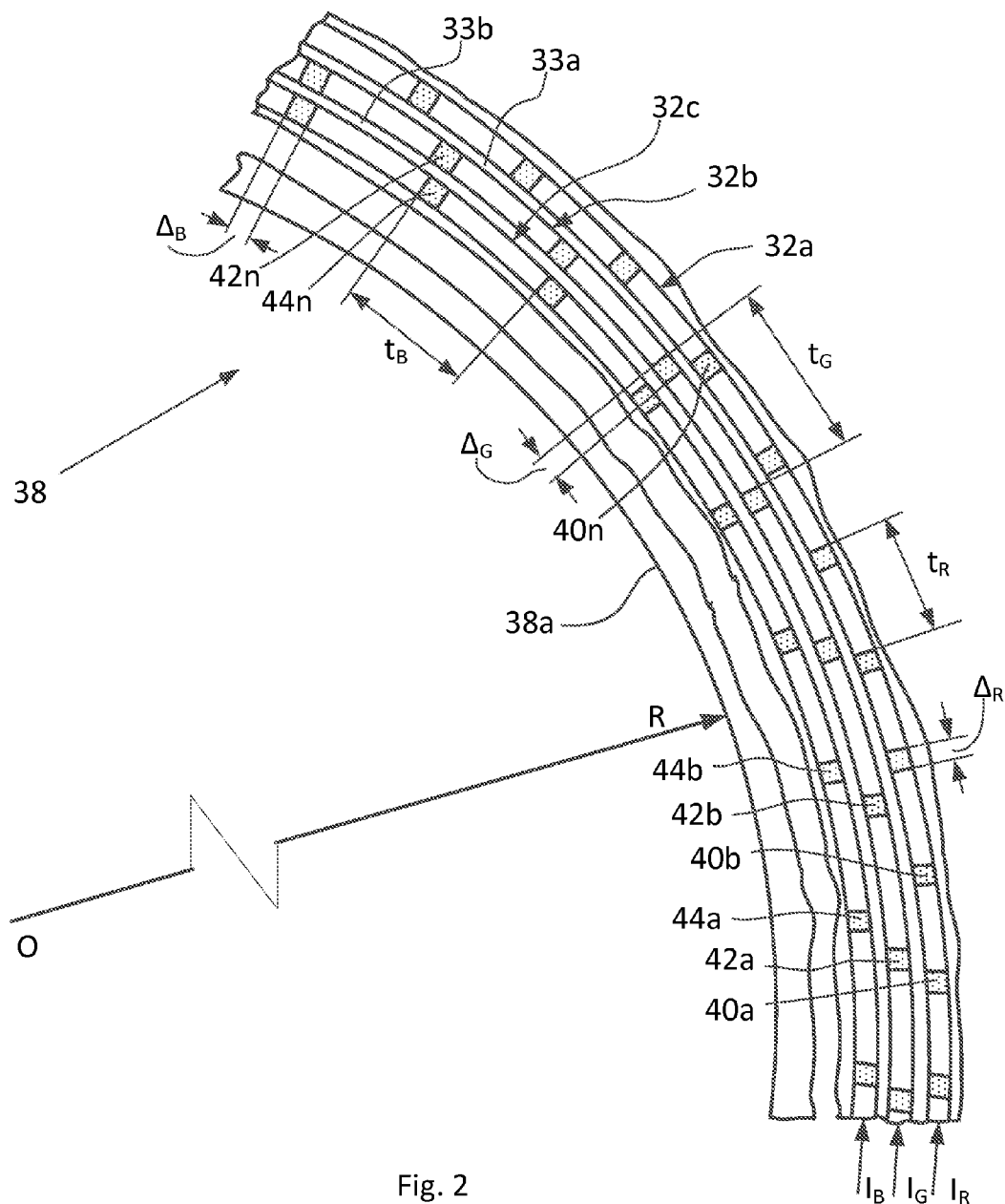
FIG. 2 is a top view of a portion of the spiral configuration of FIG. 1 shown on a larger scale.
Figure 3A:
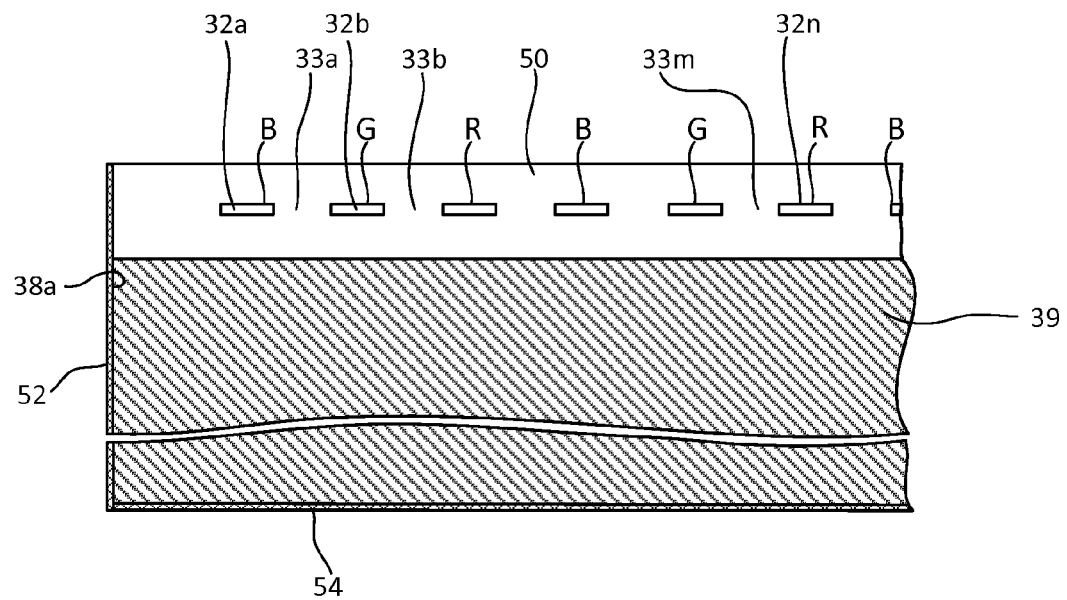
FIG. 3A is a sectional view along line IIIA-IIIA of FIG. 1 with ridge waveguide cores molded in a cladding material.
Figure 3B:
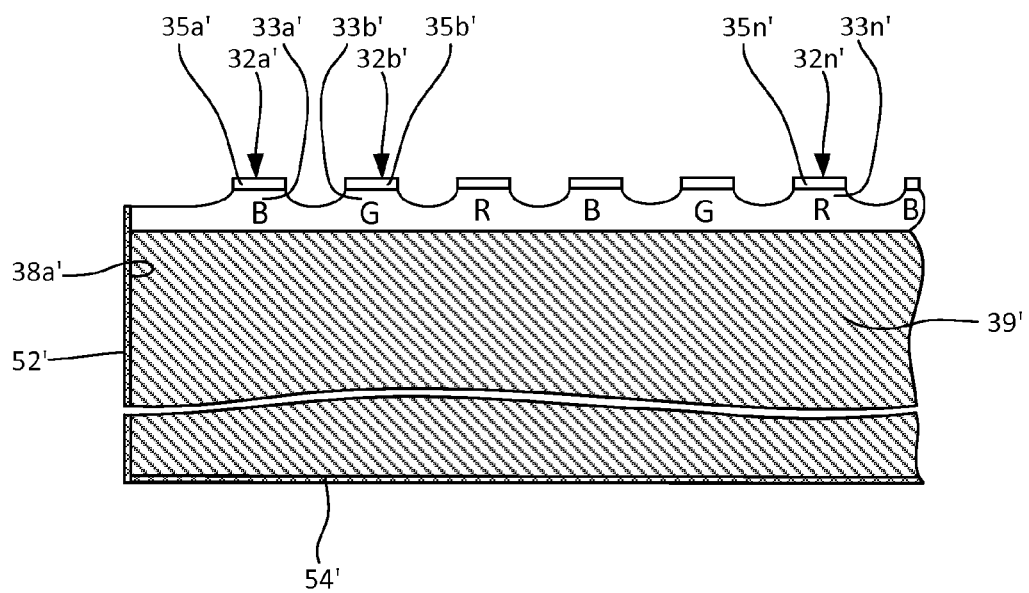
FIG. 3B is a view similar to FIG. 3A but with waveguides that do not have upper cladding.

The structural elements of the ridge waveguides are shown in greater detail in FIGS. 2, 3A, and 3B. FIG. 2 is a top view of a portion of the spiral configuration 38 in FIG. 1 shown on a larger scale; FIG. 3A is a sectional view along line IIIA-IIIA in FIG. 1 with ridge waveguide cores molded in a cladding material, the index of refraction of the core being higher than the index of refraction of the optical material that constitutes the waveguide cladding; and FIG. 3B is a view similar to FIG. 3A but with waveguides in a nonmolded state (upper cladding is absent). Generally, the difference in the index of refraction of the core and cladding should be in the region of 0.5 to 2%. Strictly speaking, in the modification shown in FIG. 3A the cladding layer is common for all cores. However, since light propagates through each core and through the surrounding area of the cladding, such a structure can be considered as a plurality of individual ridge waveguides with their specific cores and claddings.

Both FIGS. 3A and 3B illustrate respective fragments of the spiral waveguides 38 on the substrates 39 which are cut in the longitudinal and transverse direction since the ratios of thicknesses of waveguides and substrate as well as substrate length do not allow showing them entirely in real dimensional proportions.

Furthermore, FIGS. 3A and 3B show the structure of the waveguide portion of the illumination device 20. Thus it can be seen that in the modification shown in FIG. 3A, the waveguides 32a, 32b, ... 32n in fact comprise cores molded in the cladding material 50 which has an index of refraction lower than the index of refraction of the cores. In the modification shown in FIG. 3B, the waveguides 32a', 32b' ... 32n' ..., which are used in a nonmolded state, consist of respective lower claddings 33a', 33b' ... 33n' and cores 35a', 35b' ... 35n'. Reference numerals 52, 52', 54, and 54 designate blackened coatings that for a transparent substrate protects the light-permeation parts of the illumination device from scattering light energy through the outer surfaces of substrates and claddings. If a substrate is opaque, blackened coatings are not needed. The even surfaces 52a and 52a' shown in FIGS. 3A and 3B correspond to the inner wall 38a of the opening 38b formed in the center of the spiral shape shown in FIG. 1 (see section IIIA-IIIA). The inner radius R of the opening 38b is shown in FIG. 2.

It can be seen from FIGS. 2, 3A, and 3B that each turn of the spiral configuration shown in FIG. 1 in fact comprises a plurality of individual waveguides, in the illustrated modification three waveguides 32a, 32b, and 32c, which are spaced from each other by spaces 33a, 33b comparable to their widths, and that each ridge waveguide has on its surface a plurality of holograms located in sequence and in predetermined distances from each other. Thus, holograms 40a, 40b, 40c ... 40n ... are formed on the surface of the core of the ridge waveguide 32a; holograms 42a, 42b, 42c ... 42n ... are formed on the surface of the core of the ridge waveguide 32b; and holograms 44a, 44b, 44c ... 44n ... are formed on the surface of the core of ridge waveguide 32c.

In order to prevent formation of speckles, distances between neighboring holograms such as, e.g., holograms 40a and 40b, 42a and 42b, and 44a and 44b, etc. (FIG. 2) should exceed the coherence length of light propagated through respective ridge waveguides. As mentioned above, coherence length is the propagation distance from a coherent source to a point where a wave (e.g., an electromagnetic wave) maintains a specified degree of coherence. However, even if some of the holograms are spaced from each other at distances shorter than the coherence length, anyway a majority of the remaining holograms of the sequence that are located at distances exceeding the coherence length will be beyond the limits of the speckle formation interaction. By selecting distances between holograms, it becomes possible to adjust the degree of speckle formation from 0 to a predetermined value in the illumination field where light is collected. FIG. 2, $\Delta_R$ shows the length of a hologram on the waveguide 32a intended for propagation of the red laser light; $\Delta_G$ shows the length of a hologram on the waveguide 32b intended for propagation of the green laser light; and $\Delta_B$ shows the length of a hologram on the waveguide 32c intended for propagation of the blue laser light; $t_R$, $t_G$, and $t_B$ designate pitches between neighboring holograms of respective waveguides 32a, 32b, and 32c. Coherence lengths should be at least equal to and preferably greater than the pitch minus the length of the hologram, i.e., equal to or greater than $(t_R-\Delta_R)$, $(t_G-\Delta_G)$, $(t_B-\Delta_B)$.

Figure 4A:
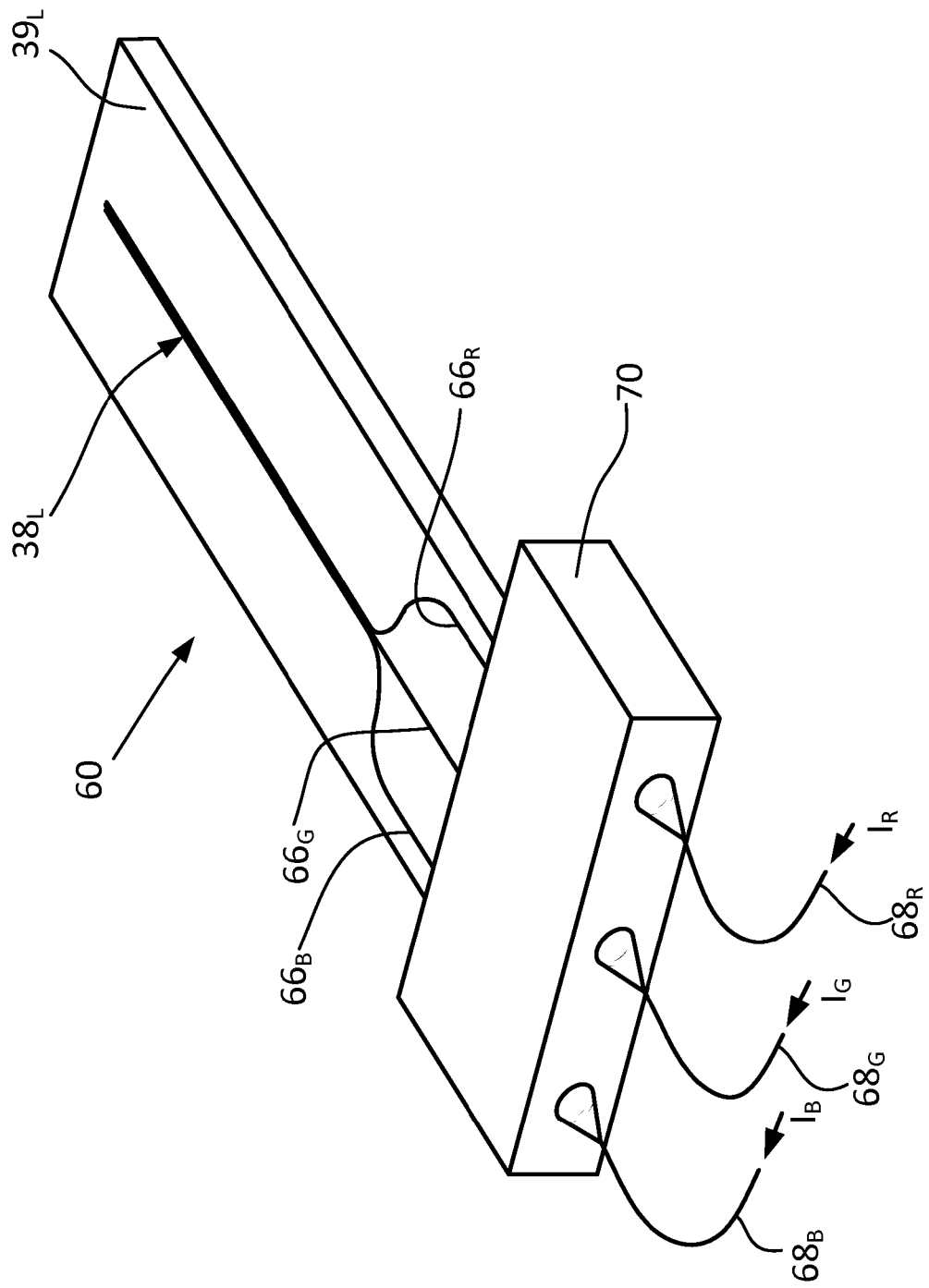
FIG. 4A is a three-dimensional view of the laser illumination device of the invention with a linear waveguide strip.

In the modification of the illumination device 20 depicted in FIGS. 1 to 3B the waveguide portion is shown as a spiral configuration 38. However, the spiral configuration is shown only as an example, and the waveguide portion may have a linear or any other configuration. An example of a linear configuration is shown in FIG. 4A, which illustrates a part of a laser illumination device 60 made in accordance with another aspect of the invention. The device 60 comprises a substrate 39$_L$ that supports a linear waveguide strip 38$_L$ that consists of a plurality of parallel linear waveguides of the type shown in FIG. 2 but in a straightened form instead of an arched portion of the spiral. Since the structure of the linear waveguide strip 38$_L$ is the same as that shown in FIG. 2, there is no need to describe the arrangement of holograms, their lengths, spacing, etc. Also, the waveguide strip 38$_L$ is shown to be composed of three individual waveguides 66$_R$, 66$_G$, 66$_B$, which are coupled to optical fibers 68$_R$, 68$_G$, 68$_B$ through a fiber-waveguide coupler 70. The fibers receive respective red, green, and blue lights $I_R$, $I_G$, $I_B$ from laser light sources (not shown in FIG. 4A). Thus, the device shown in FIG. 4A can be used as an independent laser light source with a linear light-emitting waveguide strip. As shown below, with the use of holograms formed on surfaces of the spiral or linear waveguide portions, it is possible to control the geometry and position of the light spot formed by the light-emitting holograms.

More specifically, light-emitting holograms are the elements that define output light beam parameters. As shown below, changing of geometry and orientation of holographic elements into a predetermined organization allows full control of the light beams, including change of direction, focusing, and astigmatism. The aforementioned predetermined organization defines the shape of a light field or light spot, which is to be formed by light beams emitted from the plurality of the holograms in a space at a distance from the planar ridge waveguide or by a plurality of planar ridge waveguides. The light obtained from hundreds or thousands of individual holograms is summarized in the aforementioned light field or light spot. Each individual hologram emits coherent light. However, according to the principle of the invention, light emitted simultaneously by all holograms or at least by a part of the holograms from which the light is collected is mutually incoherent. By collecting light of the aforementioned holograms into a common light spot or light field, it is possible to vary the speckle contrast from 0 to a value close to 1.

Figure 4B:
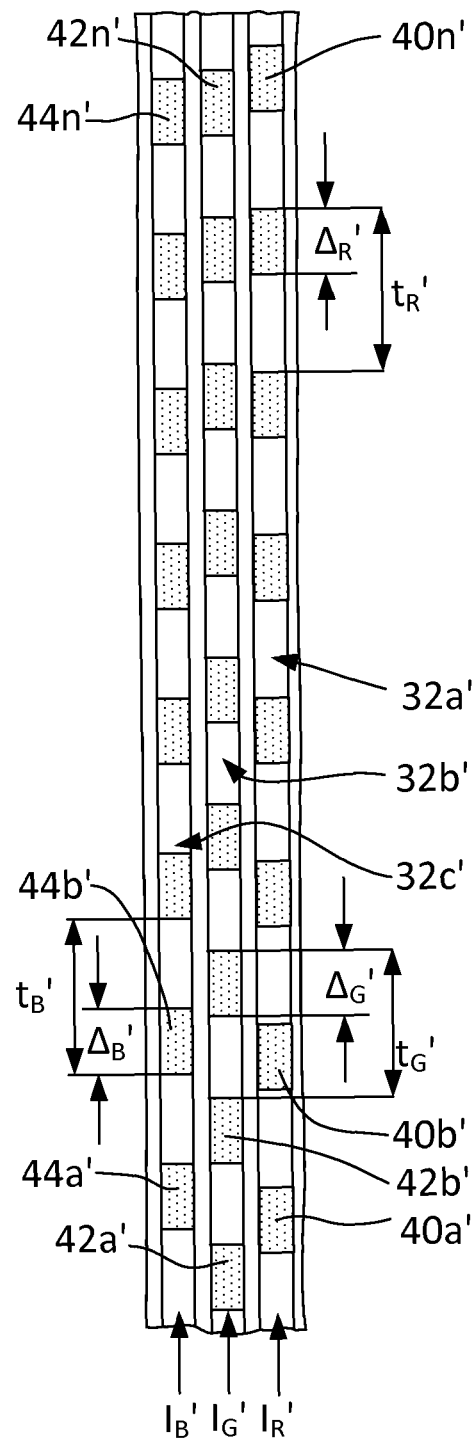
FIG. 4B is a top view of a waveguide portion of the illumination device similar to FIG. 2 but with a linear waveguide strip.

FIG. 2 shows a fragment of a ridge waveguide having a linear configuration. It is understood, however, that the waveguide portion of the laser illumination device of the invention may have an arbitrary configuration. Thus, FIG. 4B is a top view of the ridge waveguide portion that has a linear configuration. It can be seen from FIG. 4B that the ridge waveguide portion 38' comprises a plurality of individual monochromatic linear ridge waveguides, which in the modification shown in FIG. 4B are three waveguides 32a', 32b', and 32c' that are spaced from each other by spaces 33a', 33b' comparable to their widths, and that each ridge waveguide has on its surface a plurality of holograms located in sequence and at predetermined distances from each other. Thus, holograms 40a', 40b', 40c' ... 40n' ... are formed on the surface of the ridge waveguide 32a'; holograms 42a', 42b', 42c' ... 42n' ... are formed on the surface of the ridge waveguide 32b'; and holograms 44a', 44b', 44c' ... 44n' ... are formed on the surface of the ridge waveguide 32c'.

In order to prevent formation of speckles, distances between neighboring holograms such as, e.g., holograms 40a' and 40b', 42a' and 42b', and 44a' and 44b', etc. (FIG. 4B) should exceed the coherence length. As mentioned above, coherence length is the propagation distance from a coherent source to a point where a wave (e.g., an electromagnetic wave) maintains a specified degree of coherence. However, even if some of the holograms are spaced from each other at distances shorter than the coherence length, anyway a majority of the remaining holograms of the sequence that are located at distances exceeding the coherence length will be beyond the limits of the speckle formation interaction. By selecting the distances between holograms, it becomes possible to adjust the degree of speckle contrast to a predetermined value. FIG. 4B, $\Delta_R'$ shows the length of a hologram on the waveguide 32a' intended for propagation of the red laser light; $\Delta_G'$ shows the length of a hologram on the waveguide 32b' intended for propagation of the green laser light; and $\Delta_B'$ shows the length of a hologram on the waveguide 32c' intended for propagation of the blue laser light; $t_R'$, $t_G'$, and $t_B'$ designate pitches between neighboring holograms of the respective waveguides 32', 32b', and 32'c, and the coherence lengths should be at least equal to and preferably greater than the pitch minus the length of the hologram, i.e., equal to or greater than $(t_R'-\Delta_R')$, $(t_G'-\Delta_G')$, $(t_B'-\Delta_B')$.

Figure 4C:
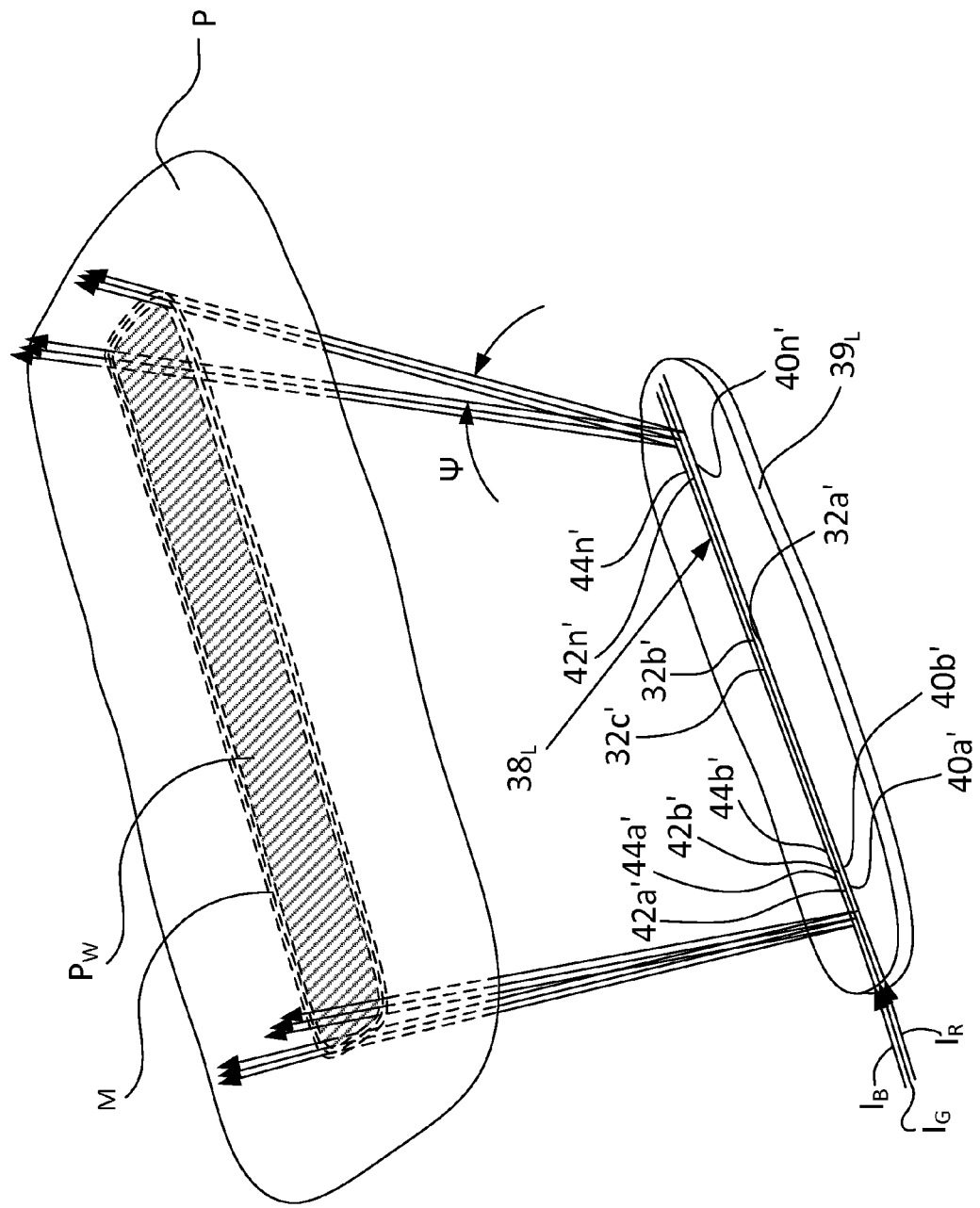
FIG. 4C is a three-dimensional view of a portion of the illumination device of the invention which can form a light field in the space above the plane of the ridge waveguide strip laid onto a substrate.

FIG. 4C is an example of a light field $P_W$ that can be formed in a space above the plane of the ridge waveguide strip 38$_L$ laid onto a substrate 39$_L$. The ridge waveguide strip 38$_L$ consists of three parallel single-mode ridge waveguides 32a', 32b', and 32c'. As mentioned above, the cores of these waveguides have sequentially arranged light-emitting holograms 40a', 40b' ... 40n' ... 42a', 42b' ... 42n' ... and 44a', 44b' ... 44n' ..., respectively. $I_R$, $I_G$, and $I_B$ designate laser lights entered into the waveguides. Holograms of the respective single-mode ridge waveguides 32a', 32b', and 32c' emit red, green, and blue light. In the illustrated modification of the illumination device, the holograms are designed (on the principles that are described in detail below) so that they form a light field $P_W$, e.g., of a substantially elongated rectangular shape, on the surface of a screen P that can be located in an arbitrary space over the ridge waveguide strip 38$_L$. The light beam emitted from all light-emitting holograms 40a', 40b' ... 40n' ..., 42a', 42b' ... 42n' ... and 44a', 44b' ... 44n' ... are collected and overlapped on the area of the light field $P_W$. It is understood from the description of the subsequent drawings (FIGS. 5A, 5B, 5C, 5E, 5F, 6C, and 6D) that the patterns of marginal holograms and of central holograms of the ridge waveguide strip 38$_L$ will be different.

More specifically, holograms of the ridge waveguides 32a', 32b', and 32c' are designed to provide equal divergence of monochromatic light emitted from them. Therefore, in the case, e.g., of RGB, one can see on screen P the white light field $P_W$. In FIG. 4C, M designates a marginal area, which is the area of nonuniform color. However, the surface occupied by the coloration area may be reduced to 3 to 1% of the surface area of the light field $P_W$ at a distance of about 10 mm above the ridge waveguide strip 38$_L$.

It would be desirable for practical application to provide light field $P_W$ with minimal possible width. Such light fields can be provided by diffractionally limited divergences of sequential holograms of each color. In FIG. 4C, divergence is designated by angle $\psi$. If a hologram covers the entire width of a waveguide, the transverse dimension of the ridge waveguide and the respective wavelength of propagated light approximately define each transverse divergence. For example, for the wavelength of red light and a waveguide width of 10 μm, the divergence will be in terms of fractions of a degree. Such divergence makes it possible to form the light field $P_W$ having a width of about 0.5 mm at a distance of about 10 mm above the ridge waveguide strip 38$_L$. The width of the light field $P_W$ can be increased to any desirable dimension by varying the geometry patterns of the light-emitting holograms 40a', 40b' ... 40n' ... 42a', 42b' ... 42n' ... and 44a', 44b' ... 44n' .... The effect of pattern parameters of light-emitting holograms on emitted light beams is described below.

FIGS. 5A to 5G are three-dimensional views of fragments 70A to 70G of monochromatic waveguide portions 72A to 72G with single holograms 74A to 74G. For clarity in drawings and simplicity of explanation, each fragment in FIGS. 5A to 5G corresponds to the aspect of the invention shown in FIG. 3B and also to the aspect of the invention shown in FIG. 3A. The fragments 70A to 70G of various modifications are identical and differ from each other only by geometry and orientation of the holograms 74A to 74G. The fragments comprise substrates 39A to 39G, which support the waveguide portions 72A to 72G. The waveguide portions comprise lower claddings 76A to 76G on which cores 78A to 78G are formed. The holograms 74A to 74G, which are considered in more detail below with reference to specific examples shown in FIGS. 5A to 5G, are formed in the cores 78A to 78G as arrays of etched trenches and projections or holographic elements 80Aa, 80Ab, ... 80An (FIG. 5A), 80Ba, 80Bb, ... 80Bn, ... 80Ga, 80Gb, ... 80Gn. The trenches are formed in the depth direction perpendicular to the plane of the ridge waveguide. The width of each trench equals half of the operation wavelength in the waveguide, and the period of the array equals the wavelength. This configuration produces a collimated light beam perpendicular or tilted to the plane of the ridge waveguide.

Full control of beam parameters is realized by a combination of the following four means for controlling light emitted from the holograms: (1) means for tilting the light beam across the longitudinal direction of the planar ridge waveguide; (2) means for tilting the light beam in the longitudinal direction of the planar ridge waveguide; (3) means for focusing or defocusing the light; and (4) means for controlling the intensity of light emitted from the holograms, said means for controlling light being used separately or in combinations.

Figure 5E:
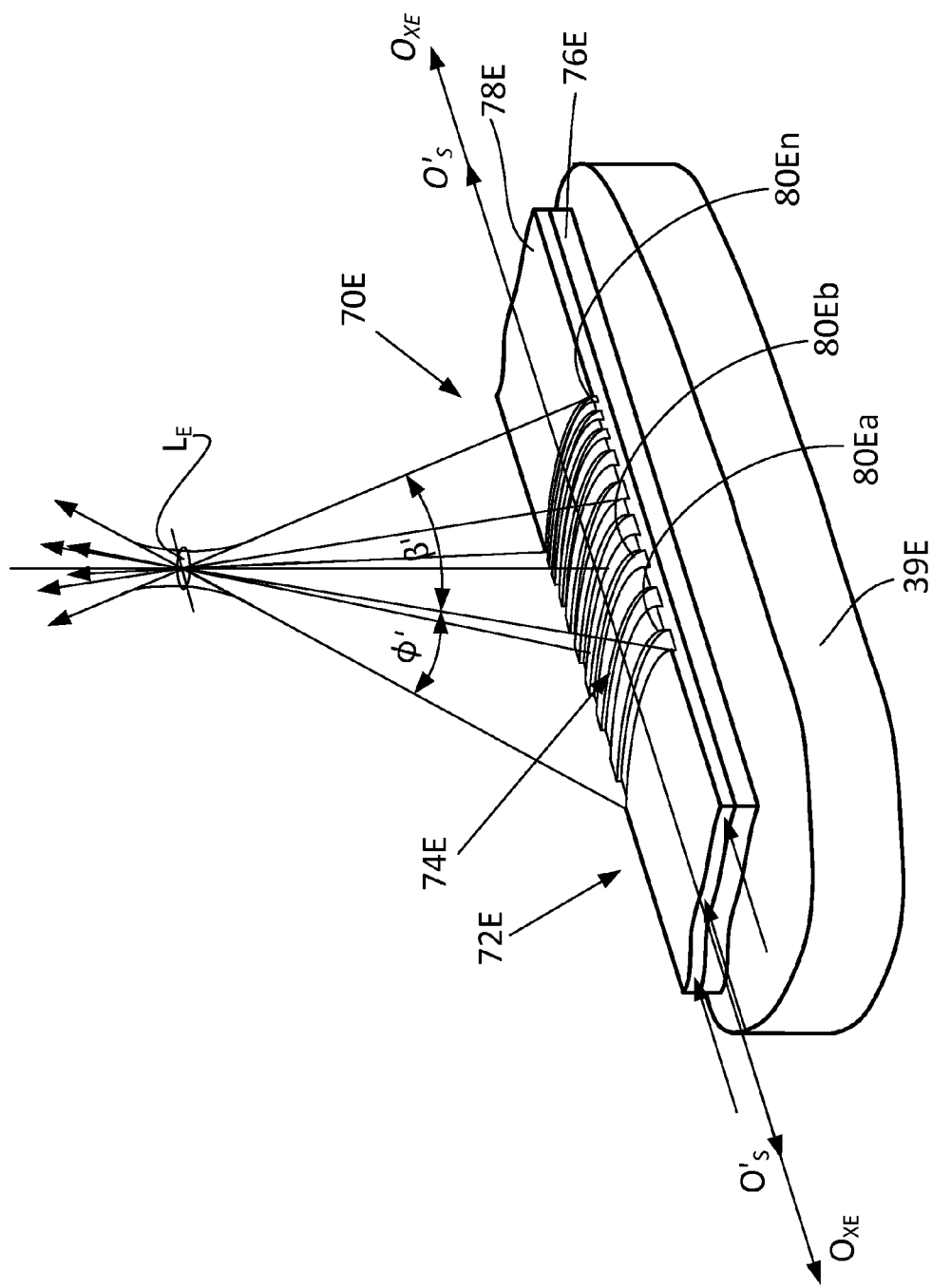
Figure 5F:
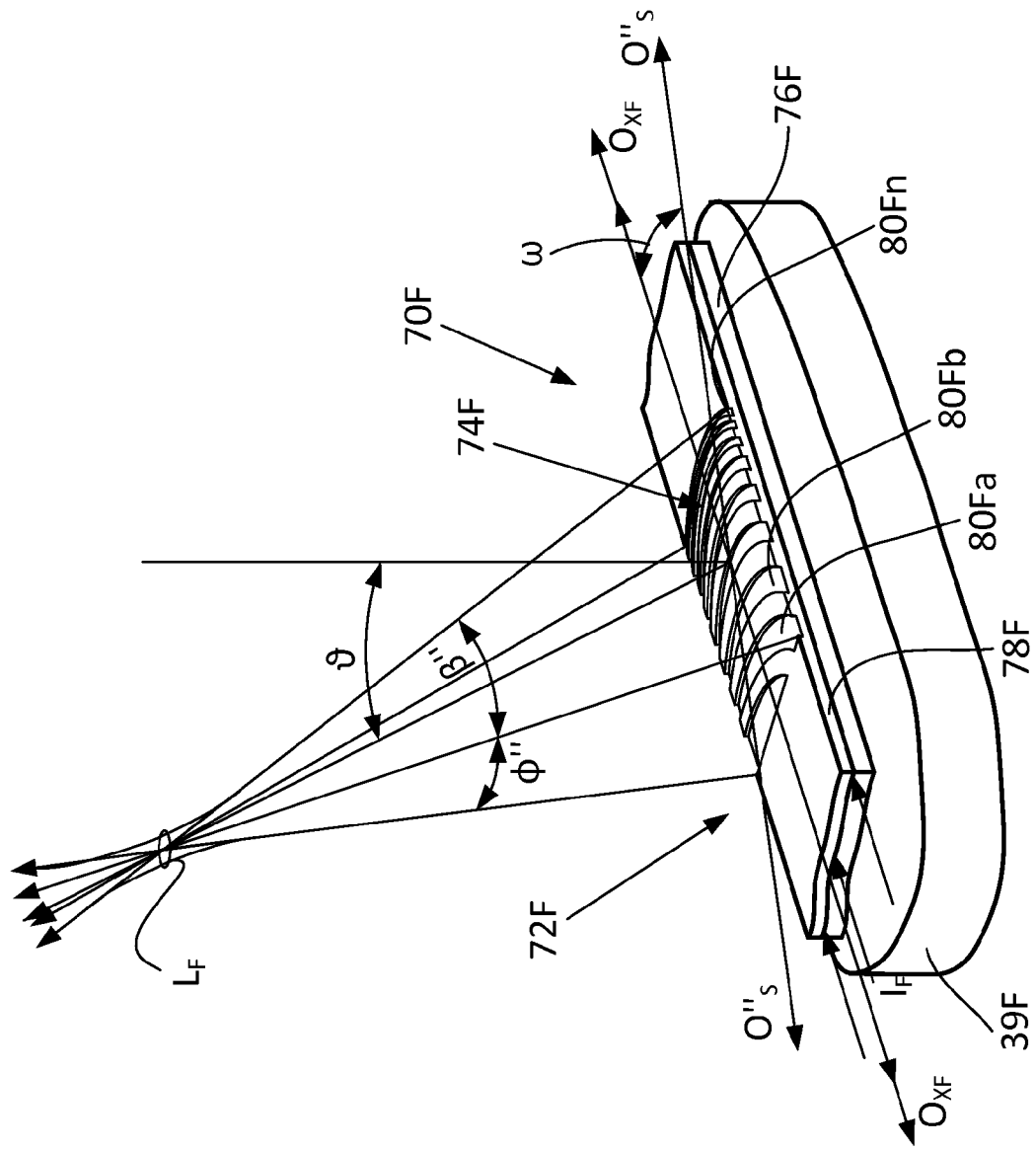

The effects of the aforementioned four means are illustrated below with reference to FIGS. 5A to 5G. In FIGS. 5A, 5B, 5D, and 5G, where holographic elements comprise linear grooves and linear projections formed in the core. These linear projections have projection directions at an angle relative to the longitudinal directions of the planar ridge waveguides. In the modifications of FIGS. 5C, 5E and 5F, the holographic elements are curvilinear.

Modification of the waveguide portion of FIG. 5A with the hologram 74A that tilts the emitted beams at a side angle φ is achieved by tilting holographic elements 80Aa, 80Ab, ... 80An at an angle α to the direction of the input light $I_A$ in the plane perpendicular to the plane of the waveguide. Although in the modification shown in FIG. 5A the light emitted by the holographic elements 80Aa, 80Ab, ... 80An is tilted to the left from the direction of the input light $I_A$, the same principle can be used for tilting the light to the right side by turning the holographic elements 80Aa, 80Ab, ... 80An at 90° to the right (such modification is not shown in the drawing since it is merely a mirror image of the device of FIG. 5A relative to the longitudinal direction of the waveguide). For a given α, the side-beam tilt angle α is given by the following relation: sin α=n tan α, where n is the effective index of refraction in the light guide. The holographic elements form a grating with a grating pitch $d_A$. The grating pitch $d_A$ of the holographic elements 80Aa, 80Ab, ... 80An must be adjusted accordingly and equals $d_A=\lambda/n \cos \alpha$, where λ is the wavelength of propagated light.

Modification of the waveguide portion of FIG. 5B shows the hologram 74B that tilts the emitted beams at an angle θ forward in the direction of the input light $I_A$ in the plane perpendicular to the plane of the waveguide. The holographic elements 80Ba, 80Bb, ... 80Bn are oriented perpendicular to the direction of the input light $I_B$, and the emitted light is tilted forward at an angle θ in the same direction as the input light $I_B$ in the plane perpendicular to plane of the waveguide. Although in the modification of FIG. 5B the light emitted by the holographic elements 80Ba, 80Bb, ... 80Bn is tilted forward, the same principle can be used to tilt the light in the direction opposite to the input light by changing the grating period of the holographic elements 80Ba, 80Bb, ... 80Bn. Tilt of the light beam in the forward or backward direction relative to the direction of input light is achieved by increasing or decreasing the grating period of the holographic elements. If θ is the angle that the beam forms perpendicular to the waveguide plane, then the required grating pitch $d_B$ is found from the following relation: sin $\theta=n-\lambda/d_B$ (n and λ are the same as defined above). As shown in FIG. 5B, angle θ is measured with reference to the normal to the plane of the ridge waveguide. This angle may have a positive or a negative value. The negative value is obtained when the direction of the beam emitted from the hologram is tilted in the direction opposite the direction of light propagating in the waveguide, and a positive θ corresponds to tilting of the emitted beam in the direction of propagated light. As can be seen from formula sin $\theta=n-\lambda/d_B$, the greater the value of $d_B$, the greater is the value of θ. Angle θ is equal to 0, when λ/n is equal to $d_B$. Let us designate the value of $d_B$ for θ=0 as $d_{B0}$. When $d_B$ is less than $d_{B0}$, sin θ acquires a negative value. In this case, θ is negative, and the beam is tilted in the direction opposite the incoming light.

Modifications shown in FIGS. 5A and 5B can be combined by arranging holographic elements at various angles φ and θ.

FIGS. 5C and 5D are examples of the illumination devices of the invention with focusing or defocusing perpendicular to input light direction. This is achieved by curving the holographic elements. The curves can be defined as algebraic curves of the second order, which have an axis of symmetry. If the required focal distance of the emitted beam is r, then the required curvature radius of the holographic element equals nr. Focusing is obtained when input light hits the concave holographic element, whereas defocusing (with the same focal distance) corresponds to the convex holographic element. Details of this configuration are given in FIG. 5C.

In the variation shown in FIG. 5C, the holographic elements 80Ca, 80Cb, ... 80Cn are algebraic curves of the second order which have an axis of symmetry $O_S$-$O_S$ (which in this case coincides with the longitudinal axis $O_{XC}$-$O_{XC}$ of the ridge waveguide). Presence of the concave curvature (FIG. 5C) provides convergence of the beams emitted from the holographic elements with angle φ. If the curvature is convex, the beams will diverge. For the case shown in FIG. 5C, the greater the curvature, the greater is angle φ. The converged light spot in the longitudinal direction of the ridge waveguide 72C is designated by $L_C$.

Regarding FIG. 5D, to converge or diverge beams emitted from the holographic elements 80Da, 80Db, ... 80Dn in the plane perpendicular to the waveguide and passing through the longitudinal axis of the waveguide $O_{XD}$-$O_{XD}$, it is necessary to "chirp" the holographic elements. In the context of the present patent application, the term "chirping" means changing the grating period of the holographic elements. In order to provide converging, $d_B$ should be greater or smaller than λ/n, with transfer of θ through the value equal to 0. Changing the grating period in the chirped grating occurs discretely from $d_{B\ min}$ to $d_{B\ max}$. For example, if the number of holographic elements is 1000, n is 1.45, and wavelength λ is 632 nm, then λ/n is 436 nm. As follows from the above, $d_{B0}$ is equal to 436 nm. Based on the above, $d_{B\ min}$ is 324 nm, and $d_{B\ max}$ is 665 nm. Thus, the increment of chirping $d_B$ for 1000 holographic elements is equal to about 0.35 nm. In other words, by knowing the required values of θ for the given λ, it is possible to calculate the parameters of holographic elements in the hologram intended for converging (focusing) the emitted beams in the direction transverse to light propagation in the ridge waveguide. In FIG. 5D, the converged light spot is designated by $L_D$.

Based on the same principle, the beams can be diverged, thus broadening the dimensions of the light spots $L_C$ and $L_D$. In this case, curves shown in FIG. 5C will be convex, and the change of the grating period in the chirped grating will occur discretely from $d_{B\ max}$ to $d_{B\ min}$.

By combining chirping with curvature of holographic elements, it is possible to form a light spot of minimal dimensions in the direction along and across the axis of the waveguide in a given plane above the waveguide. For convenience, the light spots $L_C$ and $L_D$ can be called longitudinal and transferred focuses. In other words, it is possible to obtain a light spot $L_E$ of the type shown in FIG. 5E. This light spot $L_E$ of minimal size is substantially a round shape, and the dimensions of this light spot are defined by light-diffraction limitations. Symbols and reference numerals used in FIG. 5E correspond to similar designations in previous drawings (FIGS. 5A to 5D) but with the use of index E.

As mentioned above, in the case shown in FIG. 5C, the axis of symmetry $O_S$-$O_S$ of the curved holographic elements coincides with the longitudinal axis $O_X$-$O_X$ of the ridge waveguide. However, if the axis of symmetry $O_S$-$O_S$ is turned relative to the longitudinal axis $O_X$-$O_X$ to the left or to the right, this action tilts the light spot $L_C$ to the left or to the right as well. In other words, the axis of symmetry may have a position variable from the position of coincidence with the longitudinal direction of the ridge waveguide to a position tilted with respect to the longitudinal direction of the ridge waveguide.

Thus, it can be summarized that by combining curvature of the holographic elements with chirping thereof and with deviation of axis of symmetry $O_S$-$O_S$ from the longitudinal axis $O_X$-$O_X$ of the ridge waveguide, it is possible to obtain a light spot of a given dimension in a given space over the plane of the waveguide.

FIG. 5F shows an example of the illumination device 70F of the invention with a hologram 74F that incorporates all three features mentioned above, i.e., the curving of holographic elements 80Fa, 80Fb, ... 80Fn, chirping of the holographic elements 80Fa, 80Fb, ... 80Fn, and deviation of the axis of symmetry $O''_S$-$0''_S$ relative to the longitudinal axis $O_{XF}$-$O_{XF}$. This allows the obtaining of a light spot $L_E$ having given dimensions and location at a given space over the plane of the waveguide.

Figure 5G:
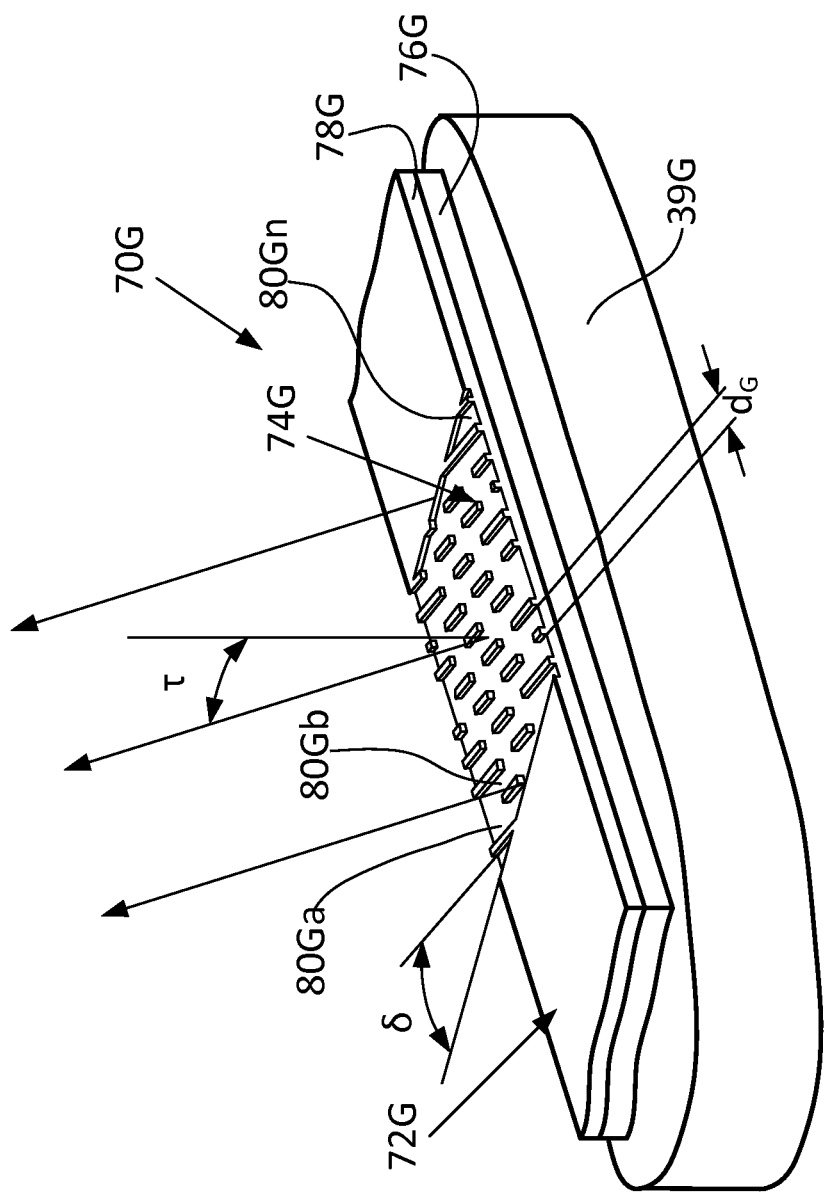

FIG. 5G shows still another modification of the waveguide portion 72G of the illumination device of the invention. In this modification, holographic elements 80Ga, 80Gb, ... 80Gn are discretely arranged and intermittent holographic elements distributed with a given density and which can be tilted individually at any desired angle, such as angles δ and τ shown in FIG. G. This modification makes it possible to control the light intensity emitted by the holograms. The higher the density of the holographic elements 80Ga, 80Gb, ... 80Gn, the higher is the intensity of emitted light.

By using combinations of the disclosed modifications, one can design light-emitting holographic elements with well-defined directional properties, which is one of the key requirements for design of the illumination device of the invention.

Figures 6A, 6B:
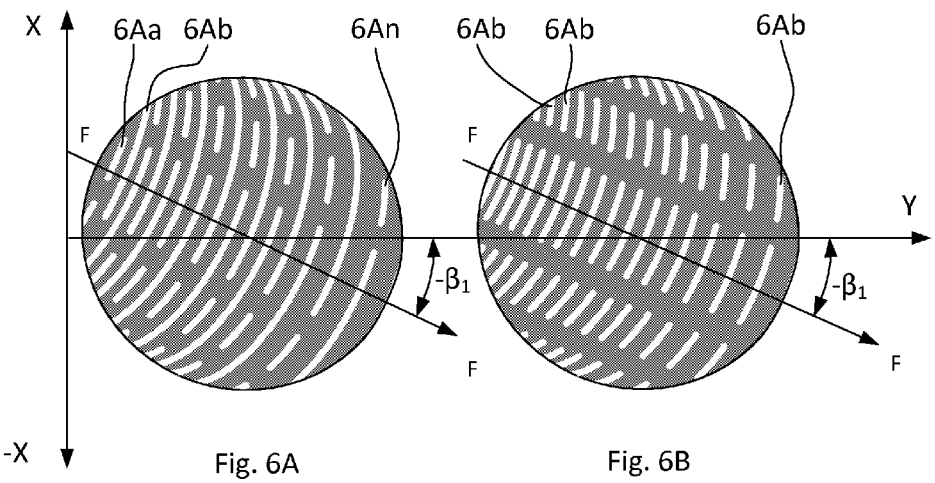
FIGS. 6A to 6D are enlarged views of holographic elements of holograms formed on portions of the spiral configuration shown in FIG. 1 and on linear configuration shown in FIG. 4.
Figures 6C, 6D:
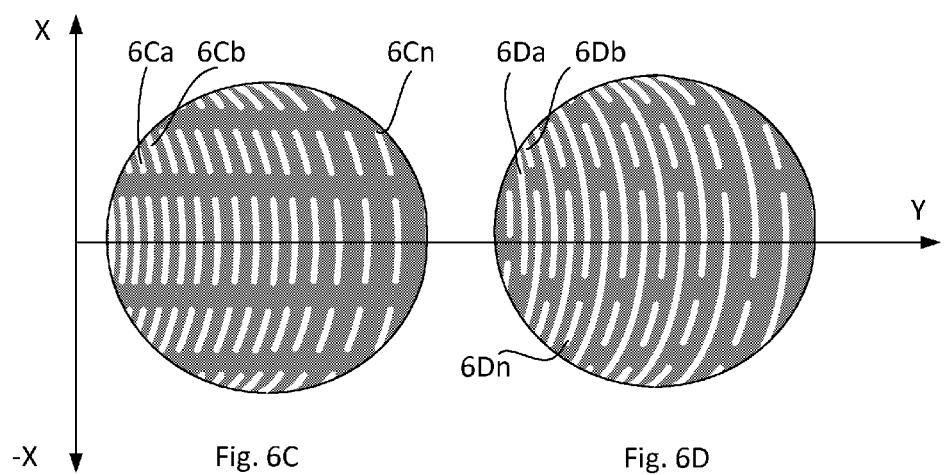

FIGS. 6A to 6D are enlarged views of holographic elements on portions of holograms formed on the spiral configuration 38 shown in FIGS. 1 and 2 and on the linear configuration $38_L$ shown in FIGS. 4A, 4B, and 4C. These drawings illustrate examples of holographic element geometry accomplished in accordance with some of the effects described above. White curvilinear stripes on a dark background are holographic elements formed on holograms of ridge waveguides. Thus, the holographic elements 6Aa, 6Ab, ... 6An shown in FIG. 6A and the holographic elements 5Ba, 6Bb, ... 6Bn are curves of the second order, e.g., hyperboles that have a focus axis F-F and a focus point on this axis at a remote location beyond the limits shown in the drawing. In FIGS. 6A and 6B, axis Y-Y corresponds to the direction of light propagation through the waveguide, e.g., to the direction of input light $I_C$ shown in FIG. 5F, where the direction of propagated light corresponds to $O_{XF}$-$O_{XF}$. In FIG. 6A, the axis F-F is tilted to the axis Y-Y at angle $-\beta_1$ and coincides with the axis $O''_S$-$O''_S$ shown in FIG. 5F.

FIG. 6B shows another possible variation of the holographic pattern.

In the arrangements shown in FIGS. 6A and 6B, holographic elements are chirped, and in the arrangement shown in FIG. 6A holographic elements in the form of long curvilinear lines alternate with short curvilinear sections which are used to adjust the coefficient of hologram density. Arrangements shown in FIGS. 6A and 6B make it possible to focus the beams emitted by the holographic elements substantially into one point. What is meant here under the term "point" is actually a light spot similar, e.g., to a focal point of a conventional optical lens. In the arrangements of holographic elements 6Ca, 6Cb ... 6Cn (FIG. 6C) and 6Da, 6Db ... 6Dn (shown in FIG. 6D), the holographic elements are arranged similar to one shown in FIG. 5F. The elements are chirped and are oriented perpendicular to axis Y, i.e., to the direction of light propagation through the waveguide. Such an arrangement makes it possible to focus light emitted from the hologram into a linear light spot similar to light spot $L_C$ in FIG. 5E. Holograms of this type can be used to modify the illumination device of the type shown in FIG. 4.

Thus, it has been shown that projections may have different shapes and may comprise parallel continuous projections, intermittent projections, a combination of continuous projections with intermittent projections, discretely arranged projections, etc. Geometry and arrangement patterns of holographic elements of the invention allow light emission at predetermined angles to the plane of the planar substrate so that light emitted from holograms of different ridge waveguides can be collected in a predetermined region in the space above or below the substrate, depending on the side to which the holograms face. Ridge waveguides can have any desired geometry, and the so-called "focus region", "light field", or "light spot" can have any desired configuration defined by a hologram pattern.

For example, as shown in FIG. 7A, which is a sectional view of the spiral configuration 38 shown in FIG. 1 on the substrate 39A', the holograms 7A on surfaces of spiral waveguides of the type shown in FIG. 2 can form a point or a light spot $L_{7A}$ located at a given remote distance from the plane of a waveguide portion 90 of the illumination device of the invention. FIG. 7B is an example of the illumination device of the invention where a point or a light spot $L_{7B}$ is formed in proximity to the surface of a waveguide portion 92 of the illumination device of the invention. Finally, the modification in FIG. 7C illustrates a waveguide portion 94 of an illumination device in which the geometry and arrangement of holographic elements makes it possible to form a diverging light beam $L_7$ to illuminate a predetermined area of interest.

In each modification shown in FIGS. 7A, 7B and 7C, monochromatic light emitted by several hundreds or thousands of holograms is collected in respective light fields $L_{7A}$, $L_{7B}$, and $L_{7C}$. This is accompanied by a complete ($L_{7A}$, $L_{7B}$) or partial ($L_{7C}$) overlapping of light beams in the area of the light spot or light field. It is understood that speckle contrast can be reduced nearly to zero.

Figure 8:
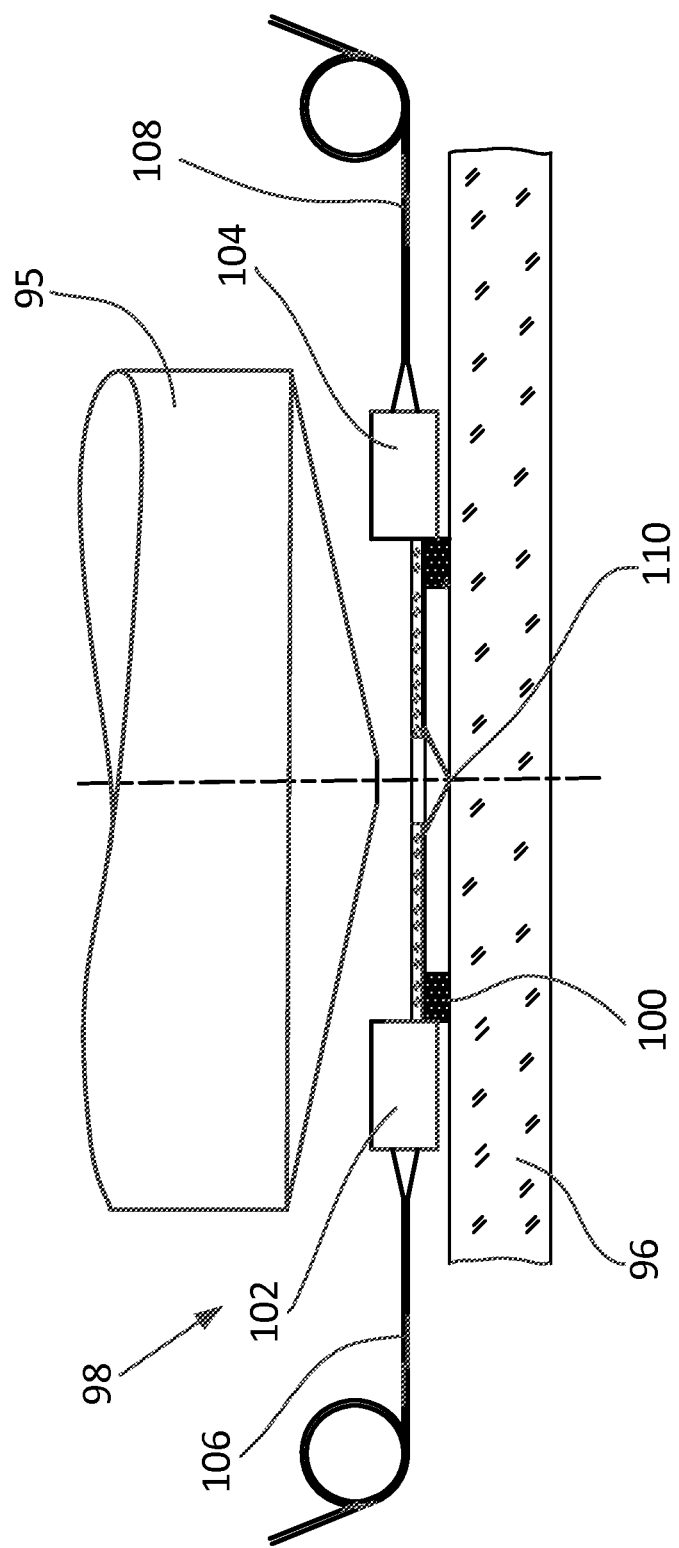
FIG. 8 is a schematic view of the device of the invention for illumination of an object on a sample table of a microscope as a practical application example.

FIG. 8 shows an example of a practical application of the illumination device of the invention. In this drawing, reference numeral 95 designates an objective lens of a microscope, and numeral 96 designates a sample table of a microscope. The illumination device 98 of the invention is placed onto the sample table 96 on an annular spacer 100. The illumination device 98 is of the type shown in FIG. 1. Reference numerals 102 and 104 conventionally show two fiber-waveguide couplers for coupling optical fibers 106 and 108 that deliver laser light from respective laser light sources (not shown) to monochromatic waveguides of the type shown in FIG. 2 of the spiral waveguide portion. In the system shown in FIG. 8, holograms focus the beams and form a light spot 110 on the area of interest of an object (not shown) for observation through the objective lens 95 of the microscope.

Although the invention has been shown and described with reference to specific embodiments, it is understood that these embodiments should not be construed as limiting the areas of application of the invention and that any changes and modifications are possible provided that these changes and modifications do not depart from the scope of the attached patent claims. For example, waveguide configuration may not be necessarily spiral or linear and may comprise a combination of linear and curvilinear shapes. In addition to the holograms shown in the drawings, holograms can be arranged in a wide variety of patterns. Also, the length of the holograms can vary in a wide range of dimensions. The number of waveguides and their mutual arrangements can vary from a single waveguide to dense nets on a plane, etc.

The invention claimed is:

1. A speckle-reduced laser illumination device comprising: at least one laser light source; a flat substrate; at least one planar ridge waveguide that has a plane and a longitudinal direction and is formed into an arbitrary configuration that is supported on the flat substrate and is coupled to the at least one laser light source for transmitting the laser light from the laser light source to the at least one planar ridge waveguide that comprises a cladding and a core; and a plurality of light-emitting holograms formed on the at least one planar ridge waveguide and arranged in sequence one after another at a distance that is equal to or exceeds the coherence length; each hologram comprising a plurality of light-emitting holographic elements that have a predetermined organization defined by the shape of a given light spot which is to be formed by light beams emitted from said plurality of holograms in a space at a distance from the at least one planar ridge waveguide, wherein at least one planar ridge waveguide comprises a cladding and a core and wherein holographic elements comprise linear grooves and linear projections formed in the core, said linear projections having a projection direction at an angle $\alpha$ relative to the longitudinal direction of the planar ridge waveguide for defining a side-beam tilt angle $\phi$ of inclination of light beams emitted from the respective holograms relative to the plane of the at least one ridge waveguide, wherein for a given $\alpha$, the side beam tilt angle $\phi$ is given by the following relation: $\sin \phi = n \tan \alpha$, where n is the effective index of refraction in the ridge waveguide.

2. The speckle-reduced laser illumination device of claim 1, wherein the holographic elements form a grating with a grating pitch $d_A$ which is equal to $\lambda/n \cos \alpha$, where $\lambda$ is the wavelength of propagated light in the ridge waveguide.

3. The speckle-reduced laser illumination device of claim 1, wherein at least one planar ridge waveguide comprises a cladding and a core and wherein holographic elements form a grating with a grating pitch $d_B$ and comprise linear grooves and linear projections formed in the core, said linear projections having a projection direction perpendicular to the longitudinal direction of the planar ridge waveguide, said linear projections defining a tilt angle $\theta$ of the light emitted by the holographic elements in the longitudinal direction of the planar ridge waveguide and in a plane perpendicular to the plane of the planar ridge waveguide, wherein angle $\theta$ is given by the following relation: $\sin \theta = n - \lambda/d_B$, wherein n is the effective index of refraction in the ridge waveguide, and $\lambda$ is the wavelength of light that propagates through the ridge waveguide.

4. The speckle-reduced laser illumination device of claim 1, wherein projections of the holographic elements have shapes selected from linear and curvilinear, and wherein in the plane view of the planar ridge waveguide the projections have a direction selected from the direction perpendicular to the longitudinal direction of the at least one plane ridge waveguide and a direction inclined with respect to the longitudinal direction of the at least one plane ridge waveguide.

5. The speckle-reduced laser illumination device of claim 4, wherein projections are selected from a group consisting of parallel continuous projections, intermittent projections, a combination of continuous projections with intermittent projections, and discretely arranged projections.

6. The speckle-reduced laser illumination device of claim 1, wherein holographic elements are algebraic curves of the second order that are chirped, form a grating with a grating period, and have an axis of symmetry, the axis of symmetry having positions variable from position of coincidence with the longitudinal direction of the at least one ridge waveguide to a position tilted with respect to the longitudinal direction of at least one ridge waveguide.

7. The speckle-reduced laser illumination device of claim 6, wherein the grating period of the holographic elements changes from a value smaller than $\lambda/n$ to a value greater than $\lambda/n$, where $\lambda$ is the wavelength of light propagating through the at least one ridge waveguide, and n is the index of refraction of the core of the at least one ridge waveguide, the chirped algebraic curves of the second order being selected from concave and convex.

8. The speckle-reduced laser illumination device of claim 1, wherein the arbitrary configuration is selected from a linear configuration and a spiral configuration.

9. The speckle-reduced laser illumination device of claim 8, further comprising means for controlling light emitted from holograms that are selected from a group consisting of (1) means for tilting light across the longitudinal direction of the planar ridge waveguide; (2) means for tilting light in the longitudinal direction of the planar ridge waveguide; (3) means for converging or diverging light; and (4) means for controlling the intensity of light emitted from the holograms, said means for controlling light being used separately or in combinations.

10. The speckle-reduced laser illumination device of claim 9, wherein the means for tilting the light across the longitudinal direction of the planar ridge waveguide comprise chirped holographic elements.

11. The speckle-reduced laser illumination device of claim 9, wherein the means for converging light in the longitudinal direction of the planar ridge waveguide comprise curvilinear holographic elements.

12. The speckle-reduced laser illumination device of claim 9, wherein the means for converging or diverging the light comprise holographic elements that are curved and chirped, wherein the curved holographic elements comprise algebraic curves of the second order.

13. The speckle-reduced laser illumination device of claim 9, wherein the means for controlling intensity of light emitted from the holograms comprise a plurality of discretely arranged intermittent holographic elements.

14. A speckle-reduced laser illumination device comprising: a plurality of laser light sources; a flat substrate; a plurality of planar ridge waveguides that correspond to a plurality of light sources, each planar ridge waveguide comprising a core and a cladding and having a width, a plane, and a direction, said planar ridge waveguides being spaced from each other at a distance comparable to their width, said ridge waveguides being formed into an arbitrary configuration that is supported on the flat substrate and is coupled to the respective laser light source of said plurality for transmitting laser light from the laser light source to the planar ridge waveguide; and a plurality of light-emitting holograms formed on each planar ridge waveguide and arranged on each ridge waveguide in sequence one after another at a distance equal to or exceeding the coherence length; each hologram comprising a plurality of light-emitting holographic elements that have a predetermined organization defined by the shape of a given light spot which is to be formed by light beams emitted from said plurality of holograms in a space and at a distance from the planar ridge waveguides, wherein at least one planar ridge waveguide comprises a cladding and a core and wherein holographic elements comprise linear grooves and linear projections formed in the core, said linear projections having a projection direction at an angle $\alpha$ relative to the longitudinal direction of the planar ridge waveguide for defining a side-beam tilt angle $\phi$ of inclination of light beams emitted from the respective holograms relative to the plane of the at least one ridge waveguide, wherein for a given $\alpha$, the side beam tilt angle $\phi$ is given by the following relation: $\sin \phi = n \tan \alpha$, where n is the effective index of refraction in the ridge waveguide.

15. The speckle-reduced laser illumination device of claim 14, wherein holographic elements comprise linear grooves and linear projections formed in the core, said laser sources comprising a red laser, a green laser, and a blue laser.

16. The speckle-reduced laser illumination device of claim 15, further comprising means for controlling the shape of said given light spot and being selected from a group consisting of means for converging light across the longitudinal direction of the planar ridge waveguide, means for converging light in the longitudinal direction of the planar ridge waveguide, means for converging or diverging light, and means for controlling the intensity of light emitted from the holograms, said means for controlling light being used separately or in combinations.

17. The speckle-reduced laser illumination device of claim 16, wherein the means for converging or diverging light comprise curved holographic elements that are chirped.

18. The speckle-reduced laser illumination device of claim 14, wherein the arbitrary configuration is selected from a linear configuration and a spiral configuration.

19. The speckle-reduced laser illumination device of claim 18, further comprising means for controlling the shape of said given light spot and being selected from a group consisting of means for converging light across the longitudinal direction of the planar ridge waveguide, means for converging light in the longitudinal direction of the planar ridge waveguide, means for converging or diverging light, and means for controlling the intensity of light emitted from the holograms, said means for controlling light being used separately or in combinations; the holographic elements comprising linear grooves and linear projections formed in the core, said laser sources comprising a red laser, a green laser, and a blue laser.

20. The speckle-reduced laser illumination device of claim 19, wherein the means for controlling intensity of light emitted from the holograms comprise discretely arranged and intermittent holographic elements distributed with a given density.

21. A speckle-reduced laser illumination device comprising: a plurality of laser light sources; a flat substrate; a plurality of planar ridge waveguides that correspond to a plurality of light sources, each planar ridge waveguide comprising a core and a cladding and having a width, a plane, and a direction, said planar ridge waveguides being spaced from each other at a distance comparable to their width, said ridge waveguides being formed into an arbitrary configuration that is supported on the flat substrate and is coupled to the respective laser light source of said plurality for transmitting laser light from the laser light source to the planar ridge waveguide; and a plurality of light-emitting holograms formed on each planar ridge waveguide and arranged on each ridge waveguide in sequence one after another, at least a part of the light-emitting holograms being arranged at a distance equal to or exceeding the coherence length; each hologram comprising a plurality of light-emitting holographic elements that have a predetermined organization defined by the shape of a given light spot which is to be formed by light beams emitted from said plurality of holograms in a space and at a distance from the planar ridge waveguides, wherein at least one planar ridge waveguide comprises a cladding and a core and wherein holographic elements comprise linear grooves and linear projections formed in the core, said linear projections having a projection direction at an angle $\alpha$ relative to the longitudinal direction of the planar ridge waveguide for defining a side-beam tilt angle $\phi$ of inclination of light beams emitted from the respective holograms relative to the plane of the at least one ridge waveguide, wherein for a given $\alpha$, the side beam tilt angle $\phi$ is given by the following relation: $\sin \phi = n \tan \alpha$, where n is the effective index of refraction in the ridge waveguide.

22. The speckle-reduced laser illumination device of claim 21, further comprising means for controlling the shape of said given light spot and being selected from a group consisting of means for converging light across the longitudinal direction of the planar ridge waveguide, means for converging light in the longitudinal direction of the planar ridge waveguide, means for converging or diverging light, and means for controlling the intensity of light emitted from the holograms, said means for controlling light being used separately or in combinations; the holographic elements comprising linear grooves and linear projections formed in the core, said laser sources comprising a red laser, a green laser, and a blue laser.

23. The speckle-reduced laser illumination device of claim 22, wherein the means for converging or diverging light comprise curved holographic elements that are chirped, the arbitrary configuration being selected from a linear configuration and a spiral configuration.

24. The speckle-reduced laser illumination device of claim 23, further comprising means for controlling the shape of said given light spot and being selected from a group consisting of means for converging light across the longitudinal direction of the planar ridge waveguide, means for converging light in the longitudinal direction of the planar ridge waveguide, and means for controlling the intensity of light emitted from the holograms, said means for controlling light being used separately or in combinations; the holographic elements comprising linear grooves and linear projections formed in the core, said laser sources comprising a red laser, a green laser, and a blue laser.

25. The speckle-reduced laser illumination device of claim 24, wherein the means for controlling intensity of light emitted from the holograms comprise discretely arranged and intermittent holographic elements distributed with a given density.

* * * * *